Patented July 15, 1952

2,603,649

UNITED STATES PATENT OFFICE 2,603,649

HETEROCYCLIC SULFONAMIDES AND METHOD OF PREPARING THE SAME

James W. Clapp, Darien, and Richard O. Roblin, Jr., Riverside, Conn., assignors to American Cyanamid Company, New York, N. Y., a corporation of Maine No Drawing. Application April 4, 1950, Serial No. 153,998

12 Claims. (Cl. 260—309)

This invention relates to heterocyclic sulfonamides and methods of preparing the same. More particularly, it relates to imidazole and benzimidazole sulfonamides and their preparation.

It is generally recognized that numerous functions and actions of the human body are largely controlled by a wide variety of enzymes. One of these numerous enzymes is called carbonic anhydrase because it is involved in the metabolism of carbon dioxide. This enzyme has other functions too, since it can catalyze the conversion of carbon dioxide to carbonic acid. The excretion of acid by the kidneys is thought to be due to this function of carbonic anhydrase.

The excretion of acid by the kidneys is one method by which the body normally conserves salt. The maintenance of a constant ratio of salt to water in the body is of utmost importance for general health. In some cases, however, excess salt and water accumulate in the tissues causing a condition which is called edema. It is frequently encountered in association with congestive heart failure. The excess salt and water cause an uncomfortable swelling of the tissues and place an added strain on the heart. To combat this condition so-called diuretic agents are sometimes used to promote the excretion of the excess salt and water. These agents, for the most part, in the past, have been mercury derivatives. Since these compounds contain mercury, they are not without toxicity on continued use, and must be administered by injection.

Shortly after sulfanilamide came into wide spread use, Mann and Keilin, Nature, 146, 164 (1940), found that it, but none of the other sulfa drugs, specifically inhibit the enzyme carbonic anhydrase. Within the past year or two sulfanilamide was experimentally used in several cases of congestive heart failure. While the sulfanilamide helped to promote the excretion of excess salt and water, it was not sufficiently active to be safely administered in adequate doses.

We have now found that certain new heterocyclic sulfonamides show much greater activity than sulfanilamide in inhibiting carbonic anhydrase. These compounds may be illustrated by the following general formula:

in which R and R' are hydrogen, alkyl or aryl radicals and X is an imidazole nucleus

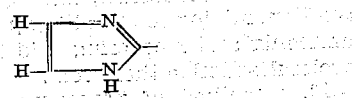

or a benzimidazole nucleus

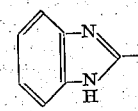

in which one or more of the hydrogen atoms may be substituted by any of the following groups alkyl, alkaryl or aryl.

The compounds are, in general, white crystalline solids having definite melting points and being soluble in water.

The compounds of the present invention are prepared by dissolving the 2-mercaptoimidazole or 2-mercaptobenzimidazole in an aqueous acid solution and passing in chlorine gas to produce the corresponding sulfonyl chloride. This product is then treated with an excess of ammonia in the form of liquid ammonia or ammonium hydroxide to produce the unsubstituted sulfonamides and with an alkylamine or an arylamine to produce compounds substituted on the sulfonamide group.

The reaction time is not too critical but chlorine should be added at such a rate that the temperature does not rise excessively and until an excess is present in the reaction mixture. The temperature during the chlorination is preferably maintained within the range of —10° C. to 25° C.

The compounds were found to be effective carbonic anhydrase inhibitors and as such, may prove valuable in the treatment of infections, in the relief of edema associated with congestive heart failure or in other conditions where inhibition of carbonic anhydrase is useful.

The following examples illustrate the preparation of representative imidazole sulfonamides and benzimidazole sulfonamides from the corresponding 2-mercaptoimidazole or 2-mercaptobenzimidazole. All parts are by weight unless otherwise indicated.

EXAMPLE 1

*2-imidazolesulfonamide*

One part of 2-mercaptoimidazole is mixed with 10 parts of 1 N hydrochloric acid and the mixture is stirred in a cooling bath while chlorine is passed in through a capillary tube until the color of excess dissolved chlorine appears in the mixture. About 70 minutes is required. The temperature of the mixture is kept below 10° C. and preferably below 5° C. to avoid excessive decomposition of the unstable sulfonyl chloride. The crude 2-imidazolesulfonyl chloride is filtered and washed with ice-cold water. It can be recrystallized from ether; the pure compound melts at 183° C., with bubbling.

The crude damp 2-imidazolesulfonyl chloride is added gradually to a large excess (35 parts) of liquid ammonia. After about fifteen minutes, the excess ammonia is allowed to evaporate and the residue is taken up in a small amount of dilute ammonium hydroxide. The extract is treated with activated charcoal, filtered, and the filtrate is neutralized with acid, with chilling. The mixture is evaporated to dryness and the residue is recrystallized from a little water. The product is obtained as a white crystalline solid, melting point, 236–236.5° C., with decomposition.

EXAMPLE 2

*1-methyl-2-imidazolesulfonamide*

In a process similar to Example 1 two parts of 2-mercapto-1-methylimidazole and 10 parts of 2 N hydrochloric acid are used, and chlorine is passed in for one hour. The 1-methyl-2-imidazolesulfonyl chloride precipitates after the reaction mixture has been partially neutralized with alkali. The damp sulfonyl chloride is converted to the corresponding sulfonamide with liquid ammonia by the method described above. The product is separated from ammonium chloride by recrystallization from ethyl acetate. The pure 1-methyl-2-imidazolesulfonamide is a white crystalline solid, melting point 148.5°–149.5° C.

EXAMPLE 3

*1-phenyl-2-imidazolesulfonamide*

In another procedure following the method of Example 1, 1.5 parts of 2-mercapto-1-phenylimidazole and 20 parts of 1 N hydrochloric acid are used, and chlorine is passed in for twenty-five minutes. The end of the reaction is judged by a fall in temperature as well as by the appearance of the color of dissolved chlorine. The crude damp 1-phenyl-2-imidazolesulfonyl chloride is converted to the sulfonamide with liquid ammonia by the method of Example 1. An excess of dilute ammonium hydroxide is required to extract the product from an insoluble fraction. The product is then precipitated with acid, filtered, and recrystallized from water. It is obtained as a white crystalline solid, melting point 170°–170.5° C. The yield is 74% of theory based on the mercapto compound.

EXAMPLE 4

*2-benzimidazolesulfonamide*

2-mercaptobenzimidazole is converted to the corresponding sulfonyl chloride by the method of Example 1, except that 20% acetic acid (100 parts to 2.5 parts of mercapto compound) is used as a reaction medium, and chlorine is passed in for fifty minutes. The crude damp sulfonyl chloride is converted to the sulfonamide with liquid ammonia by the method described above. The product is recrystallized from water. The pure compound is a white crystalline solid, melting point, 214° C., with bubbling. The yield was 43% of theory based on mercapto compound.

EXAMPLE 5

*2-imidazolesulfondi-n-butylamide*

Following the method described in Example 1, 2.5 parts of dried, crude 2-imidazolesulfonyl chloride are added gradually to a stirred solution of 3.9 parts of di-n-butylamine in 5 parts of dry pyridine. The mixture is stirred for two hours and diluted with 25 parts of water. The solid is filtered, washed, and recrystallized several times from ethanol, with the use of activated charcoal. Dilution of the alcoholic mother liquors with water permits recovery of additional product. The pure compound is a white crystalline solid, melting point, 176°–177° C.

EXAMPLE 6

*2-imidazolesulfon-p-toluide*

2-imidazolesulfonyl chloride is prepared as described in Example 1. 2.5 parts of crude dried 2-imidazolesulfonyl chloride are added gradually to a stirred solution of 2.6 parts of p-toluidine in 3 parts of dry pyridine, with chilling. The mixture is stirred for one hour with chilling and then for one hour without chilling. 25 parts of water are added, and the solid is filtered. It is extracted with dilute alkali, filtered and the filtrate acidified to precipitate the product. After a second extraction with alkali and reprecipitation with acid, the product is recrystallized from ethanol, with the use of activated charcoal. Additional product can be recovered by dilution of the alcoholic mother liquors with water. The pure compound is a white crystalline solid, melting point 208°–209° C. The yield of pure product was 20% of theory based on mercapto compound.

We claim:

1. Compounds of the group consisting of those having the general formula:

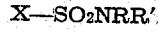

X—SO₂NRR′ in which R and R′ are members of the group consisting of hydrogen, lower alkyl and a monocyclic aromatic hydrocarbon radical and X is a heterocyclic radical of the group, consisting of 2 imidazole and 2 benzimidazole radicals.

2. 2-imidazolesulfonamide.
3. 1-methyl-2-imidazolesulfonamide.
4. 1-phenyl-2-imidazolesulfonamide.
5. 2-benzimidazolesulfonamide.
6. 2-imidazolesulfondi-n-butylamide.
7. A method of preparing compounds having the general formula:

X—SO₂NRR′ in which R and R′ are members of the group consisting of hydrogen, lower alkyl and a monocyclic aromatic hydrocarbon radical and X is a heterocyclic radical of the group consisting of 2 imidazole and 2 benzimidazole radicals which comprises reacting a member of the group consisting of 2 mercaptoimidazole and 2 mercaptobenzimidazole with chlorine in the presence of an aqueous acid solution and subsequently with a member of the group consisting of ammonia, a lower alkyl amine and a monocyclic aromatic hydrocarbon amine.

8. A method of preparing 2-imidazolesulfonamides which comprises dissolving 2-mercaptoimidazole in aqueous acid solution, passing chlorine into said solution, mixing the resulting product with liquid ammonia and recovering said 2-imidazolesulfonamide therefrom.

9. A method of preparing 1-methyl-2-imidazolesulfonamide which comprises dissolving 2-mercapto-1-methyl imidazole in an aqueous hydrochloric acid solution, passing chlorine into said solution, mixing the resulting product with liquid ammonia and recovering said 1-methyl-2-imidazolesulfonamide therefrom.

10. A method of preparing 1-phenyl-2-imidazolesulfonamide which comprises dissolving 2-mercapto-1-phenyl imidazole in an aqueous hydrochloric acid solution, passing chlorine into said solution, treating the reaction product thus obtained with liquid ammonia and recovering said 1-phenyl-2-imidazolesulfonamide therefrom.

11. A method of preparing 2-benzimidazolesulfonamide which comprises dissolving 2-mercaptobenzimidazole in an aqueous acetic acid solution, passing chlorine into said solution, mixing the reaction product thus obtained with liquid ammonia and recovering said 2-benzimidazolesulfonamide therefrom.

12. A method of preparing 2-imidazolesulfondi-n-butylamide which comprises dissolving 2-mercaptoimidazole in an aqueous hydrochloric acid solution, passing chlorine into said solution, mixing the reaction product thus obtained with di-n-butylamine and recovering said 2-imidazolesulfondi-n-butylamide therefrom.

JAMES W. CLAPP.
RICHARD O. ROBLIN, Jr.

REFERENCES CITED

The following references are of record in the file of this patent:

UNITED STATES PATENTS

| Number | Name | Date |
|---|---|---|
| 2,410,620 | Allen et al. | Nov. 5, 1946 |